United States Patent
Dufort et al.

(10) Patent No.: US 10,118,205 B2
(45) Date of Patent: Nov. 6, 2018

(54) SYSTEM AND METHOD FOR REMOVING SUPPORT STRUCTURE FROM THREE-DIMENSIONAL PRINTED OBJECTS USING MICROWAVE ENERGY

(71) Applicant: Xerox Corporation, Norwalk, CT (US)

(72) Inventors: Ron E. Dufort, Rochester, NY (US); Erwin Ruiz, Rochester, NY (US); Linn C. Hoover, Webster, NY (US); Andrew W. Hays, Fairport, NY (US); Patrick J. Howe, Fairport, NY (US); David K. Ahl, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 201 days.

(21) Appl. No.: 14/938,332

(22) Filed: Nov. 11, 2015

(65) Prior Publication Data

US 2017/0128987 A1    May 11, 2017

(51) Int. Cl.
*B08B 7/00* (2006.01)
*B29C 64/35* (2017.01)
*B33Y 40/00* (2015.01)

(52) U.S. Cl.
CPC .......... *B08B 7/0035* (2013.01); *B08B 7/0071* (2013.01); *B29C 64/35* (2017.08); *B33Y 40/00* (2014.12)

(58) Field of Classification Search
CPC ..... B08B 7/0035; B08B 7/0071; B29C 64/35; B29C 67/0092; B29C 67/0096; B33Y 40/00

(Continued)

(56) References Cited

U.S. PATENT DOCUMENTS

| | | |
|---|---|---|
| 4,959,516 A | 9/1990 | Tighe et al. |
| 5,220,346 A | 6/1993 | Carreira et al. |

(Continued)

FOREIGN PATENT DOCUMENTS

| | | |
|---|---|---|
| WO | 2014/177823 A1 | 11/2014 |
| WO | 2014/197086 A9 | 12/2014 |

OTHER PUBLICATIONS

"Microwave heating" on http://rpaulsingh.com/lectures/microwave.pdf, published on 2012 (Year: 2012).*

(Continued)

*Primary Examiner* — Matthew J Daniels
*Assistant Examiner* — Yunju Kim
(74) *Attorney, Agent, or Firm* — Maginot Moore & Beck LLP

(57) ABSTRACT

A system uses microwave energy to remove support material from a three-dimensional printed object with reduced risk of damage to the object. The system includes a microwave source, a three port device, a susceptor, a temperature sensor, and a controller. The controller operates the microwave source to direct microwave energy into a first port of the three port device, which emits the microwave at a second port of the three port device to irradiate the three-dimensional object and melt the support material. Reflected microwave increases as the amount of support material contacting the object is reduced and enters the second port of the three port device, which directs the reflected energy to the susceptor coupled to a third port of the three port device. The controller monitors the signal generated by the temperature sensor and deactivates the microwave source in response to a predetermined condition being reached.

10 Claims, 6 Drawing Sheets

(58) Field of Classification Search
USPC .......................................................... 425/174
See application file for complete search history.

(56) References Cited

U.S. PATENT DOCUMENTS

| | | | |
|---|---|---|---|
| 5,386,500 A * | 1/1995 | Pomerantz | B33Y 50/02 |
| | | | 264/401 |
| 5,422,463 A | 6/1995 | Gooray et al. | |
| 5,563,644 A | 10/1996 | Isganitis et al. | |
| 5,631,685 A | 5/1997 | Gooray et al. | |
| 6,155,331 A | 12/2000 | Langer et al. | |
| 6,869,559 B2 | 3/2005 | Hopkins | |
| 8,459,280 B2 | 6/2013 | Swanson et al. | |
| 2003/0222366 A1 | 12/2003 | Stangel et al. | |
| 2013/0075957 A1* | 3/2013 | Swanson | B08B 3/104 |
| | | | 264/405 |
| 2013/0337277 A1 | 12/2013 | Dikovsky et al. | |
| 2014/0332997 A1 | 11/2014 | Shih et al. | |

OTHER PUBLICATIONS

Definition of Sensor—Wikipedia, Oct. 23, 2015 (Year: 2015).*
Sizgek_et_al—2002—Chemical_Engineering_&_Technology (Year: 2002).*

* cited by examiner

SYSTEM AND METHOD FOR REMOVING SUPPORT STRUCTURE FROM THREE-DIMENSIONAL PRINTED OBJECTS USING MICROWAVE ENERGY

TECHNICAL FIELD

The system and method disclosed in this document relates to processing of three-dimensional printed objects and, more particularly, to the removal of support material from three-dimensional printed objects using microwave energy.

BACKGROUND

Digital three-dimensional object manufacturing, also known as digital additive manufacturing, is a process of making a three-dimensional solid object of virtually any shape from a digital model. Three-dimensional object printing is an additive process in which successive layers of material are formed on a substrate in different shapes. The layers can be formed by ejecting binder material, directed energy deposition, extruding material, ejecting material, fusing powder beds, laminating sheets, or exposing liquid photopolymer material to a curing radiation. The substrate on which the layers are formed is supported either on a platform that can be moved three dimensionally by operation of actuators operatively connected to the platform, or the material deposition devices are operatively connected to one or more actuators for controlled movement of the deposition devices to produce the layers that form the object. Three-dimensional object printing is distinguishable from traditional object-forming techniques, which mostly rely on the removal of material from a work piece by a subtractive process, such as cutting or drilling.

Manufacturing of three-dimensional printed parts at high speed is a significant challenge because many of the processes involved are time consuming and often done manually. In many three-dimensional object printers, support material is included in a layer to enable areas of object material in the layer to be formed where no surface or previously formed portions of the object exist. Particularly, these support areas are formed with a support material, such as wax, on top of areas of the object or adjacent to portions of the object. After the object is formed, the support material is removed from the object. The support material is typically removed by soaking the object in water, jetting water onto the object, soaking the object in chemicals other than water, or heating the object in a convection oven. However, each of these methods has limitations that are exacerbated as the size of the printed object increases.

As three-dimensional object printers become larger to increase the volume production of the printer, multiple parts can be stacked in three-dimensions, separated by support material. However, in these multiple object production runs, a substantial amount of support material must be removed after the objects are fully formed. What is needed is a method for efficient removal of substantial amounts of support material from printed parts in order to increase overall production speeds.

SUMMARY

A method of removing support material from one or more three-dimensional printed objects using microwaves with reduced risk of object damage includes operating a transport with at least one controller to move a platen supporting the three-dimensional printed object, operating a microwave source with the at least one controller to direct microwave energy into a first portion of a three port device to emit microwave energy from a second port of the three port device and irradiate the three-dimensional printed object having support material with microwave energy, the microwave energy heating the support material to a temperature at which the support material changes phase from a solid to a liquid so the support material flows away from the object, directing microwave energy received at the second port of the three port device to a susceptor operatively connected to a third port of the three port device, generating with a temperature sensor a signal indicative of a temperature of the susceptor, and deactivating the microwave source with the at least one controller operatively connected to the temperature sensor and the microwave source in response to the temperature indicated by the generated signal reaching a predetermined condition.

A system that removes support material from one or more three-dimensional printed objects using microwaves with reduced risk of object damage includes a platen that supports the three-dimensional printed object having support material, a transport configured to move the platen, a three port device configured to direct microwave energy received on a first port to a second port and to direct microwave energy received at the second port to a third port, a susceptor operatively connected to the third port of the three port device, a temperature sensor configured to generate a signal indicative of a temperature of the susceptor, a microwave source configured to direct microwaves to the first port of the three port device to irradiate the object having support material with microwave energy from the second port of the three port device, the microwave energy heating the support material to a temperature at which the support material changes phase from a solid to a liquid so the support material flows away from the object, and at least one controller operatively connected to the transport, the temperature sensor, and the microwave source, the controller being configured to operate the microwave source with reference to the signal generated by the temperature sensor.

BRIEF DESCRIPTION OF THE DRAWINGS

The foregoing aspects and other features of the method and printer are explained in the following description, taken in connection with the accompanying drawings.

DETAILED DESCRIPTION

Figure 1:
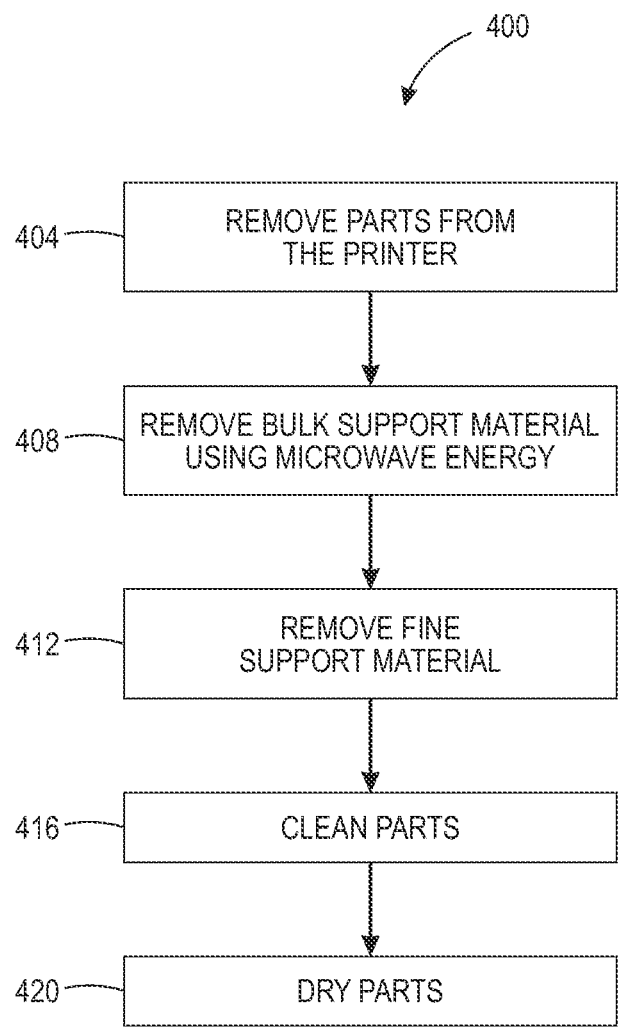
FIG. 1 is a flow diagram of a process for removing support material from a printed object with microwave energy.

For a general understanding of the environment for the method disclosed herein as well as the details for the method, reference is made to the drawings. In the drawings, like reference numerals designate like elements.

Figure 5:
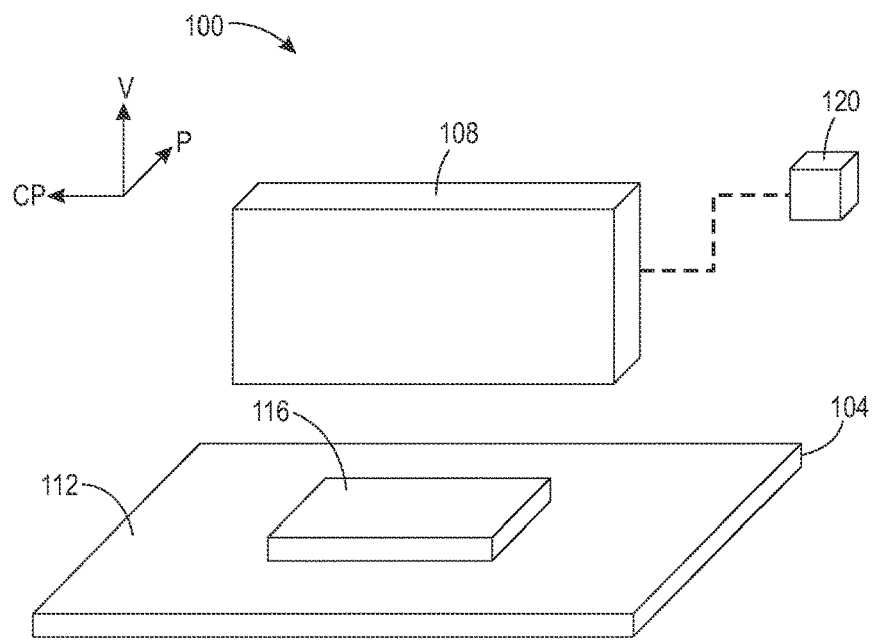
FIG. 5 shows a prior art three-dimensional object printer.

FIG. 5 shows a prior art three-dimensional object printer 100 that ejects material to form support and object areas in layers. The printer 100 comprises a platen 104 and an ejector head 108. The ejector head 108 has a plurality of ejectors configured to eject drops of material towards a surface 112 of the platen 104 to form a three-dimensional object, such as the part 116, and support areas that enable part feature formation. Particularly, the ejector head 108 has a first plurality of ejectors configured to eject drops of a build material to form an object and a second plurality of ejectors configured to eject drops of a support material, such as wax, to form a scaffolding to support the object being formed. As used in this document, "support" means one or more layers of support material on which layers of build material are built adjacent to or upon to enable layers of a portion of the object to be formed without deformation caused by gravity or laminar flow of the build material prior to the build material being converted from a fluid or powder to a solid by a curing process such as thermal fusing or exposure to UV radiation. "Support material" means a material used in the printing of an object that is removed from the object after the object is printed. The ejector head 108 is configured to move relative to the platen 104 in the process direction P, the cross-process direction CP, and the vertical direction V. In some embodiments, the printer 100 includes actuators configured to move one or both of the ejector head 108 and the platen 104 with respect to one another.

The printer 100 includes a controller 120 operatively connected to at least the ejector head 108. The controller 120 is configured to operate the ejector head 108 with reference to object image data that has been rendered into layers that form a three-dimensional object on the platen surface 112. To form each layer of the three-dimensional object, the controller 120 operates the printer 100 to sweep the ejector head 108 one or more times in the process direction P, while ejecting drops of material onto the platen 104. In the case of multiple passes, the ejector head 108 shifts in the cross-process direction CP between each sweep. After each layer is formed, the ejector head 108 moves away from the platen 104 in the vertical direction V to begin printing the next layer.

Figure 6:
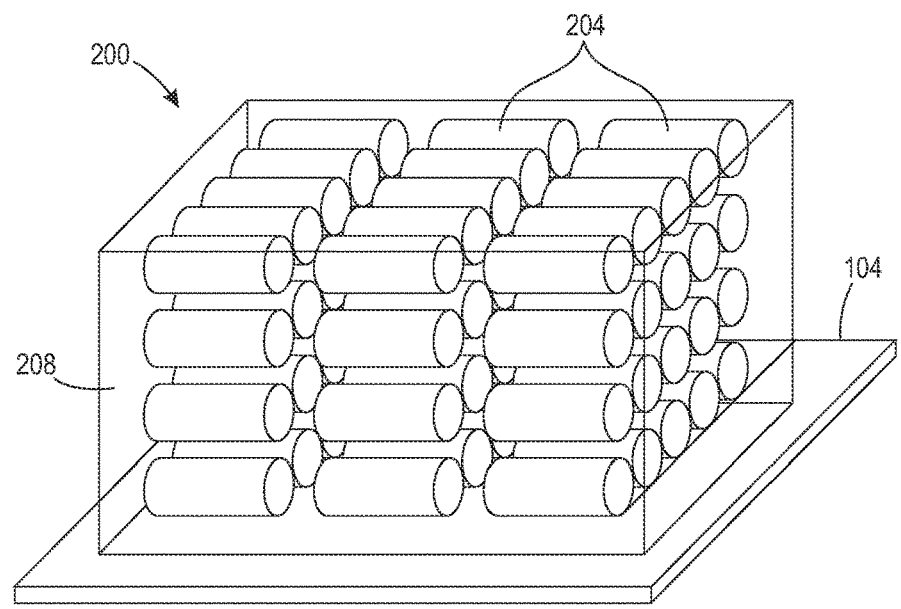
FIG. 6 shows a perspective view of a prior art printed block having a plurality of identical parts separated by support material.
Figure 7:
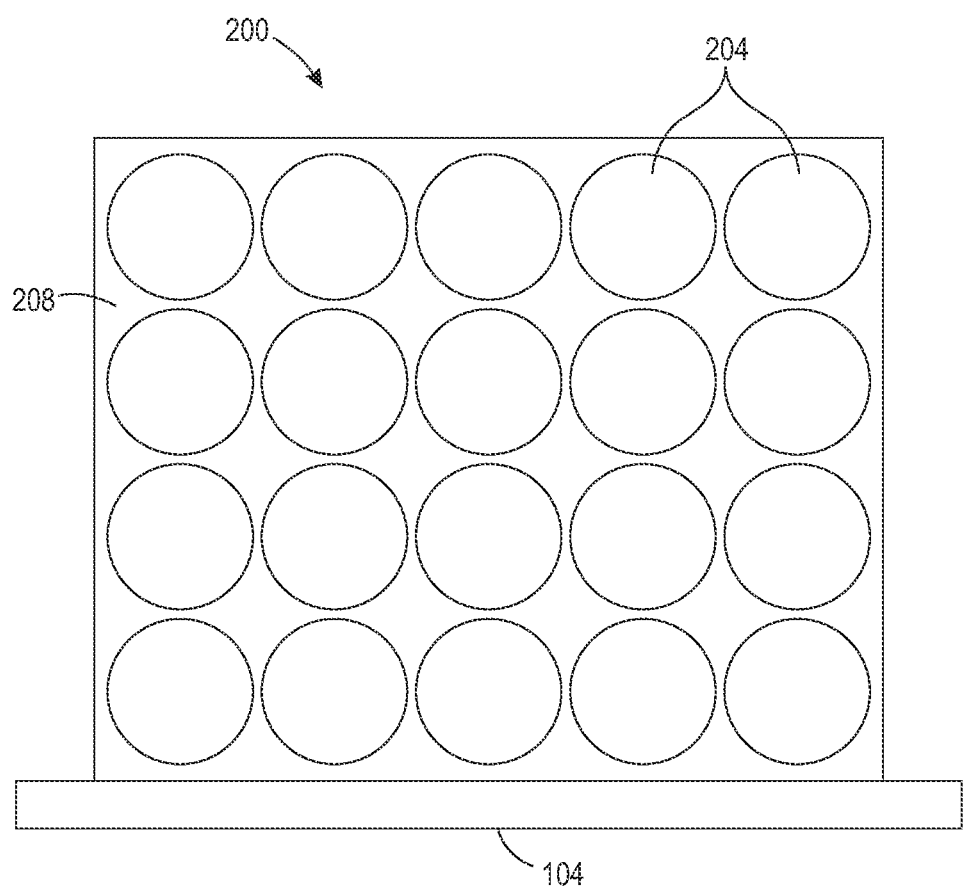
FIG. 7 shows a side view of the prior art block shown in FIG. 4.

In some embodiments, the printer 100 is sufficiently large to enable production runs comprising more than one part. Particularly, a plurality of parts can be printed in a single print job with each part being encapsulated by support material to form a block of material. In some embodiments, the controller 120 receives image data corresponding to a plurality of parts arranged in three-dimensional space with support material arranged between each of the parts to allow the plurality of parts to be printed as a single block. With reference to the image data, the controller 120 operates the ejector head 108 to form the plurality of parts in a single production run. FIG. 6 shows a perspective view of a prior art block 200 having a plurality of identical parts 204 formed on the platen 104. The parts 204 are essentially arranged in a three-dimensional matrix and can be uniformly spaced throughout the block 200. The parts 204 are separated by support material 208. In other embodiments, the plurality of parts may be different types of parts and may be arranged with respect to one another to efficiently use the space within the block 200. FIG. 7 shows a side view of the prior art block 200.

As shown in FIGS. 6 and 7, the block 200 comprises a substantial amount of support material 208 that must be removed to release the parts 204. To hasten the support material removal process that was performed with a conventional convection oven, process 400 of FIG. 1 uses microwave energy to heat and phase change the support material 208. In the description of the process 400, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 120 of the printer 100 noted above can be configured with components and programmed instruction to provide a controller or processor that performs the process 400. Alternatively, the controller can be implemented with more than one processor and associated circuitry and components, each of which is configured to form one or more tasks or functions described herein.

The method 400 begins by removing the parts from the printer (block 404). The parts can be removed by lifting the parts 204 that contain support material 208 from the platen 104 or by moving the platen 104, which supports the parts 204 that contain the support material 208, out of the printer. If the parts require additional curing, they are exposed to the curing radiation or allowed to cool for solidification of the materials. Once the parts are cured, the bulk support material is removed using microwave energy (block 408). In previously known methods for removing bulk support material, the parts 204 are placed in a convection oven heated to a predetermined temperature at which the support material 208 changes from a solid phase to a liquid phase. For example, a convection oven can be heated to a temperature of 65 degrees Celsius to melt wax support material provided the part is left in the oven cavity for an amount of time adequate for the support material to reach the melting temperature. The part 204 containing wax support material is typically left in the heated cavity of a convection oven at a temperature of 65 degrees Celsius for approximately 60 to 120 minutes to enable the wax support material to melt and separate from the part 204. The temperature of the part 204 is typically monitored and the part 204 is removed from the oven in response to the temperature of the part reaching a predetermined threshold temperature that is below the temperature at which the build material of the part begins to deform. Because some of the support material may remain, the part 204 is further treated to remove the smaller remaining amounts of support material (block 412). In one embodiment, this further treatment includes submerging the part 204 in a rinse solution held at a predetermined temperature, for example, 60 degrees Celsius, and subjected to ultrasonic vibrations in the solution. The ultrasonic vibrations in this embodiment are applied for approximately 5 minutes. Once the vibrations are terminated, the part remains in the solution for another predetermined period of time, such as 2 minutes, before the part is removed from the support material bath and placed in a cleaning vat (block 416). The cleaning vat typically includes warm soapy water and ultrasonic vibrations are again applied to the part in the soapy water for another predetermined time period, such as 20 minutes. The part is then removed from the cleaning vat and dried (block 420). The drying can occur in ambient air or in a convection oven heated to a relatively mild temperature, such as 40 degrees Celsius.

Figure 2A:
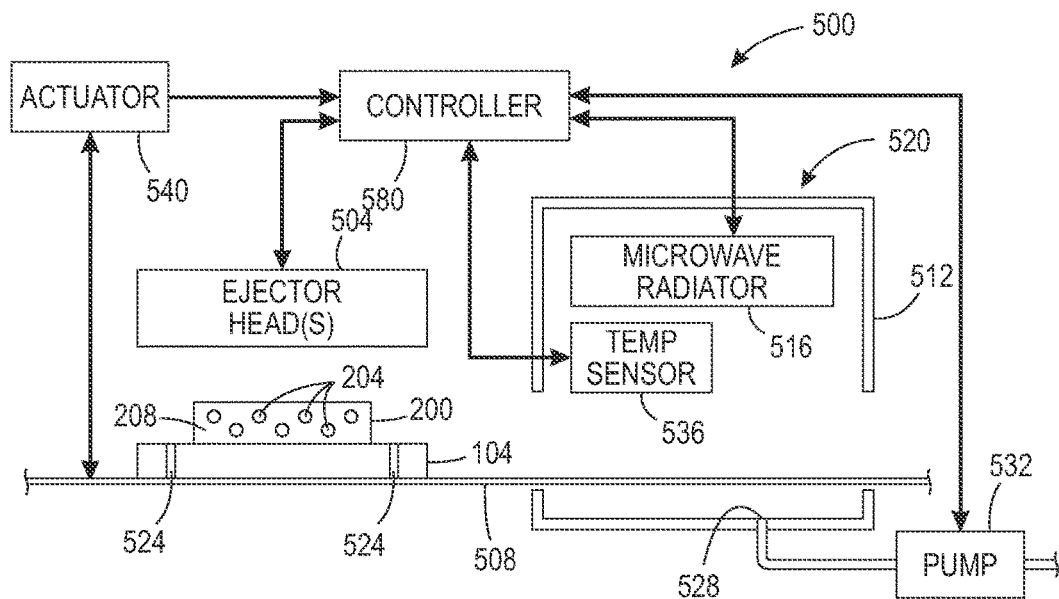
FIG. 2A depicts a system that enables support material to be removed from a printed object with microwave energy.

A three-dimensional object production system 500 is shown in FIG. 2A. The system 500 includes one or more ejector heads 504, a controller 580, a non-contact temperature sensor 536, a microwave radiator 516, and a housing 512. Controller 580 can be the controller 120 configured with programmed instructions and components to operate the ejector head(s) 504 to form an object with support material and to operate the microwave heating station 520 to remove the support material. Each of the ejector heads contains a plurality of ejectors that the controller 580 operates to eject a plurality of materials to form object and support areas in the layers of the parts formed on the platen 104. The platen 104 is supported by a transport 508 that moves the block 200 with the parts 204 and the support material 208 from the position beneath the ejector head(s) 504 to the microwave heating station 520. The microwave heating station 520 includes the housing 512 having an ingress and egress to enable the transport 508 to move the block 200 into the housing 512 of the station 520 and then move the platen and the parts 204 out of the housing to the next processing station. Within the housing 512, a microwave radiator 516 is positioned to irradiate the block 200 with microwave energy while the transport 508 remains still to enable the block 200 to be subjected to the emitted microwave energy for a predetermined period of time or until the temperature of the parts 204 reach a temperature that indicates the part is approaching, but has not reached, a temperature that could damage the part. In the embodiment that monitors the part temperature, the non-contact temperature sensor 536 generates a signal indicative of the part temperature that the controller 580 compares to a predetermined temperature threshold. When the predetermined temperature threshold has been reached or the predetermined time period has expired, the controller 580 operates an actuator 540 that drives transport 508 to move the parts 204 out of the housing to the next processing station.

Figure 2B:
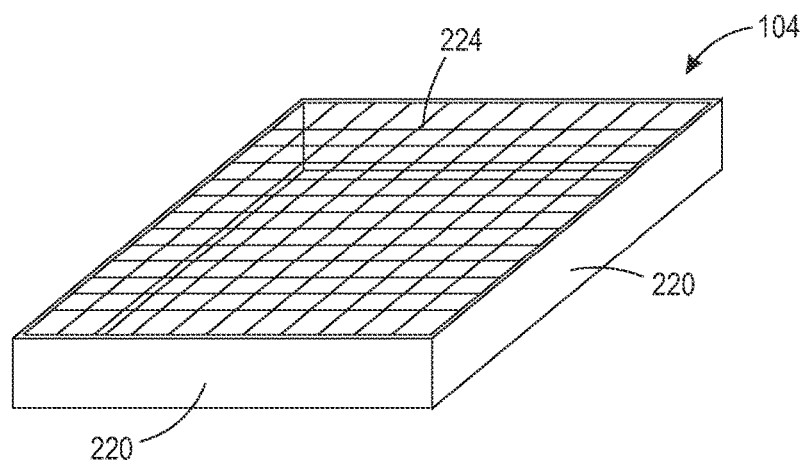
FIG. 2B depicts an alternative embodiment of the platen in the system of FIG. 2A.

The platen 104 shown in FIG. 2A includes one or more through holes 524 that enable the melted support material to leave the platen 104 and fall to the floor of the housing 512. The floor of the housing 512 includes a drain 528 that enables the melted support material to exit the housing 512. The controller 580 can be operatively connected to a pump 532 to urge the melted support material to leave the housing 512 or the floor of the housing 512 can be formed with a slope that enables the melted support material to flow to the drain 528 and leave the housing 512 under the effect of gravity. In an alternate embodiment shown in FIG. 2B, the platen 104 is a box having solid sides 220 and an open top. A metal screen 224 is placed over the open top and the block 200 rests on the metal screen. During exposure to the microwaves, the melted support material flows through the metal screen into the metal box where it solidifies. The material solidifies because the openings in the screen are sized to prevent microwave energy from entering the box through the screen in a known manner.

The above-described method and system are effective for removing support material from the parts when the support material has a dielectric loss factor that is greater than a dielectric loss factor of the build material. "Dielectric loss factor" is a measurement of the energy dissipated as heat by a material in an oscillating field. The dielectric loss factor of the support material enables the microwave energy to heat the support material and produce a phase change in the support material without significantly heating the build material of the part. Thus, the support material is melted and removed from the parts without damaging or adversely affecting the parts. Another advantage of using a support material that has a dielectric loss factor that is greater than the dielectric loss factor of the build material is that the support material and build material can have melting temperatures that are close to one another, but the difference in the dielectric loss factors of the two materials enables the support material to reach that temperature before the build material begins to approach the melting temperature.

Figure 3:
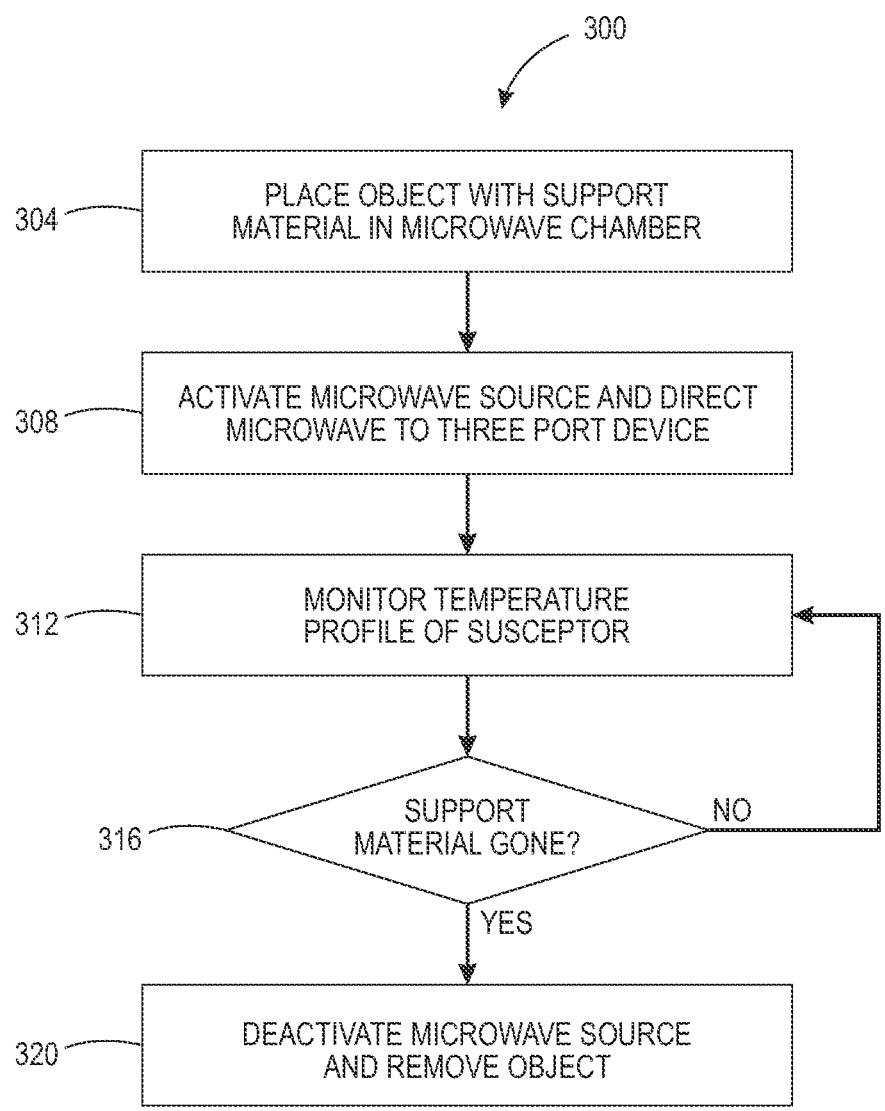
FIG. 3 is a flow diagram of a process for using a susceptor to protect the object being treated in a microwave heating station.

While the system and method described above with regard to FIG. 1 and FIG. 2 is typically effective for the removal of support material from printed objects, the configuration of some objects can present issues. That is, the configuration of some objects can make the estimation of an amount of microwave exposure time or predetermined object temperature difficult because the geometry of the object makes the amounts and distribution of the support material in the object complicated to represent. If the microwave energy is applied for the estimated time or until the estimated temperature is reached in such configurations, the object may receive an amount of microwave energy that can damage or deform the object. To address such object configurations, the process and microwave heating station of FIG. 3 and FIG. 4, respectively, has been developed.

The process 300 begins with the object having support material being placed in the microwave chamber (block 304). The microwave source is activated and the microwave energy is directed into a three port device called a magnetic circulator (block 308). The magnetic circulator is a known component that receives microwave energy in a first port and directs the energy to a second port, where it is emitted into the microwave chamber. Because the dielectric loss factor of the support material is higher than the build material of the object, the support material is heated by the microwave energy and melts. As the support material melts and flows away from the object, the microwave energy is reflected in the chamber and a portion of the energy is directed into the second port. The microwave energy entering the second port is directed by the magnetic circulator to the third port, which is coupled to a susceptor. A susceptor is material that absorbs electromagnetic radiation and converts it to heat. Known susceptors include metalized films, ceramics, certain metals, and water. When water is used to absorb the microwave energy so it does not heat the part in the cavity, it flows through a heat exchanger to dissipate the heat it absorbs. Additionally, the susceptor is selected so the dielectric loss factor of the susceptor is less than the dielectric loss factor of the support material, but greater than the dielectric loss factor of the build material. A susceptor material appropriate for use with many support and build materials is silicon carbide, Thus, by monitoring the temperature profile of the susceptor (block 312), a controller operatively connected to a temperature sensor that generates a signal indicative of the temperature of the susceptor can detect when the susceptor begins to receive microwave energy because the temperature of the susceptor begins to increase. By monitoring the temperature of the susceptor, the controller can detect whether the support material in the chamber has melted. The rate of change in the temperature of the susceptor is slow until the support material is reduced to a low level. Because the amount of support material in the cavity is approaching zero, more microwave energy is reflected from the chamber into the second port, which directs it to the susceptor coupled to the third port. As the susceptor receives more microwave energy, the temperature of the susceptor begins to increase at a higher rate, which indicates the support material is practically gone (block 316) and the microwave source is deactivated and the object is removed from the chamber (block 320). Alternatively, the temperature signal generated by the sensor 554 can be monitored until it reaches a predetermined temperature and the microwave source is deactivated in response to the generated signal indicating the predetermined temperature has been reached.

Figure 4:
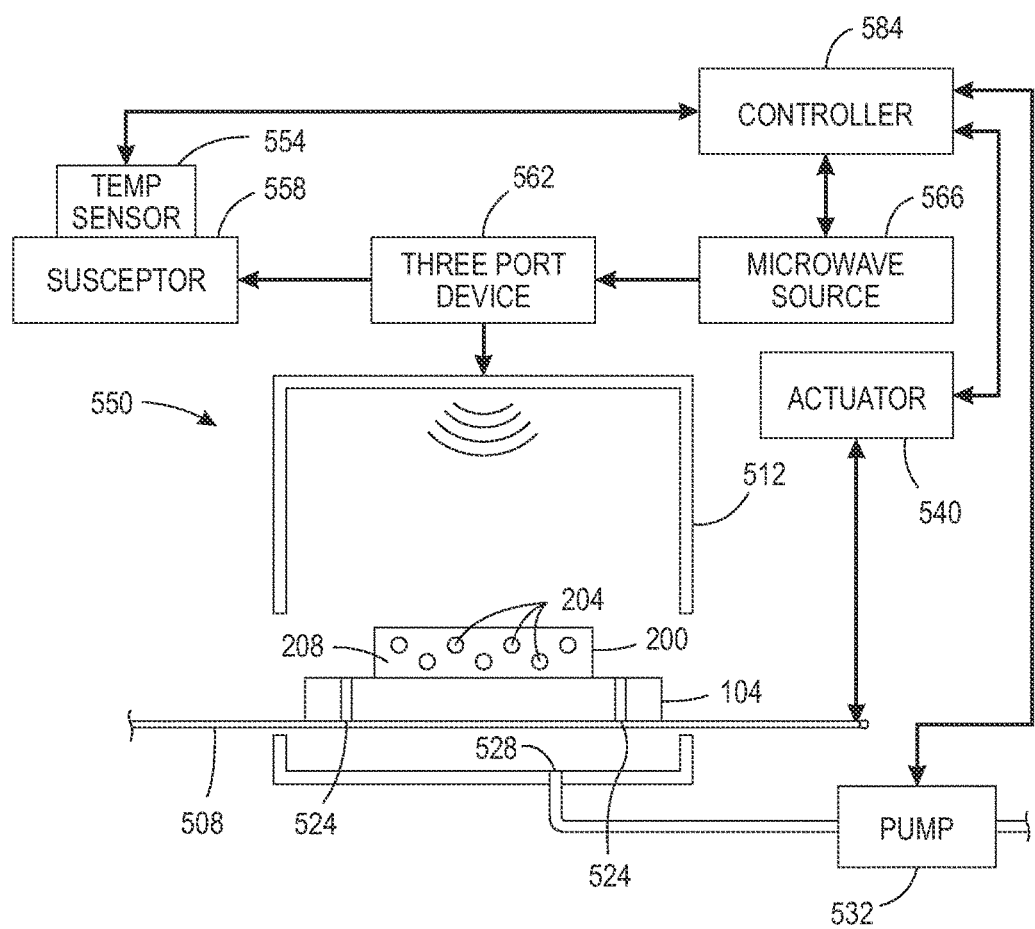
FIG. 4 depicts a microwave heating station that is configured to use a susceptor to protect the object being treated in the microwave heating station.

A microwave heating station 550 that is used to implement the process 300 is shown in FIG. 4. The microwave heating station 550 includes a controller 584 that is operatively connected to a temperature sensor 554, a microwave source 566, an actuator 540, and a pump 532. The microwave source 566 can be any commonly known generator of microwave energy, such as a magnetron. As used in this document, "microwave energy" means electromagnetic radiation in the frequency range of about 300 MHz to about 300 GHz. A three port device 562, such as a magnetic circulator, is coupled to the output of the microwave source 566 to receive microwave energy at its first port. The three port device directs the microwave energy to exit from the second port into the chamber within housing 512 to heat the support material 208, which has a greater dielectric loss factor than the build material of the parts 204. The third port of the three port device is also coupled to a susceptor 558, which has a dielectric loss factor that is less than the dielectric loss factor of the support material, but greater than the dielectric loss factor of the build material. As discussed above, the reflected microwave energy in the chamber increases as the support material in the cavity absorbs the energy and melts. As the amount of this energy entering the second port and being delivered to the susceptor 558 coupled to the third port increases, the rate of change in the temperature of the susceptor also increases. The controller 584 is configured with programmed instructions to monitor the signal indicative of the temperature of the susceptor 558 generated by the temperature sensor 554 and generate a profile of the rate of change of the susceptor temperature. When the controller detects an increase in the rate of change in the temperature of the susceptor that indicates that the amount of support material within the chamber is approaching zero, the controller deactivates the microwave source 566 since most or all of the support material has been melted. Alternatively, the controller 584 can monitor the signal generated by the sensor 554 until the controller detects the temperature indicated by the generated signal has reached a predetermined temperature and then the controller deactivates the microwave source. The controller 584 can then operate the actuator 540 to move the transport 508 so the platen 104 exits the housing 512. The remaining components of the microwave heating station 550 operate as described above with reference to FIG. 4. As used in this document, the term "amount of support material approaching zero" means almost no solid support material remains in contact with the part or object.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A system for removing support material from a three-dimensional printed object comprising:
   a platen that supports the three-dimensional printed object having support material;
   a three port device having a first port, a second port, and a third port, the first port being configured to direct microwaves received by the first port from outside the three port device to the second port for emission from the second port and the second port being configured to direct microwaves received by the second port from outside the three port device to the third port;
   a susceptor operatively connected to the third port of the three port device;
   a temperature sensor configured to generate a signal indicative of a temperature of the susceptor;
   a microwave source configured to direct microwaves to the first port of the three port device for emission from the second port to irradiate the three-dimensional object having support material with the microwaves directed to the second port by the first port to heat the support material to a temperature at which the support material changes phase from a solid to a liquid to enable the liquid support material to flow away from the object; and
   at least one controller operatively connected to the temperature sensor and the microwave source, the controller being configured to operate the microwave source with reference to the signal generated by the temperature sensor.

2. The system of claim 1 further comprising:
   a transport configured to move the platen;
   a housing operatively connected to the second port of the three port device to enable the microwaves emitted from the second port to irradiate the three-dimensional object on the platen within the housing, the housing having a first opening and a second opening; and
   the at least one controller being operatively connected to the transport, the at least one controller being further configured to operate the transport to move the platen supporting the three-dimensional object having support material through the first opening to a position within the housing.

3. The system of claim 2, the platen further comprising:
   at least one opening through the platen to enable the liquid support material to pass through the platen.

4. The system of claim 3, the housing further comprising:
   a drain in a floor of the housing to enable the liquid support material that passed through the platen to flow out of the housing.

5. The system of claim 4 further comprising:
   a pump operatively connected to the drain to urge the liquid support material that passed through the platen to flow through the drain.

6. The system of claim 1, the at least one controller being further configured to operate the microwave source to irradiate the three dimensional object on the platen with the microwaves emitted from the second port until the signal generated by the temperature sensor indicates that the susceptor has reached a predetermined temperature.

7. The system of claim 1, the at least one controller being further configured to operate the microwave source to irradiate the three dimensional object on the platen with the microwaves emitted from the second port until the signal generated by the temperature sensor corresponds to a rate of change in the temperature of the susceptor that indicates an amount of solid support material on the three dimensional object is approaching zero.

8. The system of claim 1 wherein the susceptor has a dielectric loss factor that is less than a dielectric loss factor of the support material and is greater than a dielectric loss factor of a build material used to form the object.

9. The system of claim 8 wherein the susceptor is essentially comprised of silicon carbide.

10. The system of claim 1 wherein the three port device is a magnetic circulator.

* * * * *